(12) United States Patent
Shapiro et al.

(10) Patent No.: US 11,796,377 B2
(45) Date of Patent: Oct. 24, 2023

(54) REMOTE CONTACTLESS LIQUID CONTAINER VOLUMETRY

(71) Applicant: Baker Hughes Holdings LLC, Houston, TX (US)

(72) Inventors: Vladimir Shapiro, Newton, MA (US); Ozge Whiting, Pawtucket, RI (US); Taufiq Dhanani, San Ramon, CA (US); Weiwei Qian, Niskayuna, NY (US); John Hare, Highland, NY (US); Michael Clatworthy, Boston, MA (US); Rick Hunter, Houston, TX (US); Matthias Odisio, Dallas, TX (US); John Passarelli, Weymouth, MA (US)

(73) Assignee: Baker Hughes Holdings LLC, Houston, TX (US)

(*) Notice: Subject to any disclaimer, the term of this patent is extended or adjusted under 35 U.S.C. 154(b) by 171 days.

(21) Appl. No.: 17/345,431

(22) Filed: Jun. 11, 2021

(65) Prior Publication Data

US 2021/0407121 A1    Dec. 30, 2021

Related U.S. Application Data

(60) Provisional application No. 63/043,457, filed on Jun. 24, 2020.

(51) Int. Cl.
*G01F 23/292* (2006.01)
*G06T 7/62* (2017.01)
(Continued)

(52) U.S. Cl.
CPC ............ *G01F 23/292* (2013.01); *G01F 25/20* (2022.01); *G06T 7/62* (2017.01); *G06V 20/10* (2022.01);
(Continued)

(58) Field of Classification Search
CPC .... G06T 7/50; G06T 7/55; G06T 7/10; G06T 7/11; G06T 17/00; G06T 7/0004;
(Continued)

(56) References Cited

U.S. PATENT DOCUMENTS

| 5,427,161 A | 6/1995 | Luhmann et al. |
| 7,840,360 B1 * | 11/2010 | Micheels ................. G01J 3/42 |
| | | 382/142 |

(Continued)

FOREIGN PATENT DOCUMENTS

| CN | 102436268 B | 12/2016 |
| JP | 2006-258643 A | 9/2006 |

(Continued)

OTHER PUBLICATIONS

International Search Report and Written Opinion corresponding to International Application No. PCT/US2021/070734, dated Oct. 13, 2021.

*Primary Examiner* — Ian L Lemieux
*Assistant Examiner* — Woo C Rhim
(74) *Attorney, Agent, or Firm* — MINTZ LEVIN COHN FERRIS GLOVSKY AND POPEO, PC

(57) ABSTRACT

In an embodiment, a volumetry method is provided. The method can include receiving one or more 2D images of a site including one or more containers configured to hold a liquid, the 2D images being acquired at a first time. The method can also include identifying a container within the 2D images. The method can further include selecting an identified container within the 2D images for volumetric analysis based upon a degree of occlusion of its front facing surface. The method can additionally include classifying a portion of the selected container containing the liquid. The method can further include determining the volume of liquid held within the container based upon the classified portion.

20 Claims, 10 Drawing Sheets

(51) Int. Cl.
  *G01F 25/20* (2022.01)
  *G06V 20/10* (2022.01)
  *G06V 20/52* (2022.01)
  *G06V 20/64* (2022.01)

(52) U.S. Cl.
  CPC ............ *G06V 20/52* (2022.01); *G06V 20/647* (2022.01); *G06T 2207/20076* (2013.01)

(58) Field of Classification Search
  CPC .... G06T 7/00; G06T 7/60; G06T 7/62; G06T 2207/10048; G06V 10/40; G06V 10/44; G06V 10/443; G06V 10/449; G06V 10/451; G06V 10/454; G06V 20/10; G06V 20/176; G06V 20/52; G06V 20/647; G01F 23/00; G01F 23/22; G01F 23/28; G01F 23/284; G01F 17/00; G01F 25/20; G01F 22/00; G01N 21/00; G01N 21/17; G01N 21/25; G01N 21/47; G01N 21/49; G01N 21/51; G01N 21/35; G01N 21/359

See application file for complete search history.

(56) References Cited

U.S. PATENT DOCUMENTS

| | | | | |
|---|---|---|---|---|
| 8,842,874 B1* | 9/2014 | Alphenaar | ............... | G06T 7/62 |
| | | | | 382/141 |
| 2010/0014770 A1* | 1/2010 | Huggett | ................... | G06T 3/00 |
| | | | | 382/254 |
| 2012/0134576 A1* | 5/2012 | Sharma | ................ | G06V 10/462 |
| | | | | 382/206 |
| 2013/0106850 A1* | 5/2013 | Endo | .................... | H04N 13/111 |
| | | | | 345/421 |
| 2015/0163400 A1* | 6/2015 | Geiss | ..................... | H04N 23/80 |
| | | | | 348/231.99 |
| 2016/0343124 A1* | 11/2016 | Sundheimer | ............ | G01F 22/00 |
| 2017/0293800 A1* | 10/2017 | Babenko | ................. | G06F 18/28 |
| 2017/0294027 A1 | 10/2017 | Babenko | ............. | G06V 20/176 |
| 2018/0182122 A1* | 6/2018 | Babenko | .......... | G06V 30/19173 |
| 2018/0232900 A1* | 8/2018 | Kraft | .................. | G06V 10/7715 |
| 2018/0336693 A1* | 11/2018 | De Franchis | ........ | G06V 20/176 |
| 2018/0364268 A1* | 12/2018 | Kluckner | ............ | G01B 11/245 |
| 2019/0033209 A1* | 1/2019 | Kluckner | ............... | G01N 35/04 |
| 2019/0180464 A1* | 6/2019 | Kraft | ......................... | G06T 7/62 |
| 2019/0197466 A1* | 6/2019 | Hand, III | ................ | G06F 16/51 |
| 2019/0206059 A1* | 7/2019 | Landman | .................. | G06T 7/66 |
| 2019/0244340 A1* | 8/2019 | Perron | ................. | G06V 10/454 |
| 2020/0005438 A1* | 1/2020 | Morikawa | ............... | G06T 15/04 |
| 2020/0041325 A1 | 2/2020 | Zucchelli et al. | | |
| 2020/0042817 A1* | 2/2020 | Gatto | ..................... | G01N 21/31 |
| 2020/0057880 A1* | 2/2020 | Mizutani | ................ | G06V 20/69 |
| 2021/0270662 A1* | 9/2021 | Grimm | ............... | G01F 23/2928 |
| 2021/0304422 A1* | 9/2021 | Yu | .............................. | G06T 5/50 |
| 2021/0404856 A1* | 12/2021 | Lins | ........................ | G01F 23/80 |

FOREIGN PATENT DOCUMENTS

| | | | |
|---|---|---|---|
| JP | 2018503906 A | * | 2/2018 |
| WO | 2020-117780 A1 | | 6/2020 |

\* cited by examiner

REMOTE CONTACTLESS LIQUID CONTAINER VOLUMETRY

CROSS-REFERENCE TO RELATED APPLICATIONS

This application claims the benefit of U.S. Provisional Patent Application No. 63/043,457, filed on Jun. 24, 2020 and entitled "Remote Contactless Liquid Vessel Volumetry," the entirety of which is hereby incorporated by reference.

BACKGROUND

Industrial operations can include containers designed to contain liquids. As an example, an oil well pad can contain a number of oil, water, chemical and other containers filled with liquids. It can be desirable to monitor the amount of liquid within such containers in order to facilitate emptying and refilling at times required by the operation procedures.

SUMMARY

A commonly adopted technique for determining the level (e.g., volume) of liquid within containers is to have a human operator travel to the location of the container, and conduct a visual inspection. While devices for measuring liquid level have been developed, they are not considered to be reliable enough to rely upon without manual verification. Furthermore, such level indicators require connectivity (e.g., to a network) in order to report observations. Additionally, human operators are still required for installation, as well as regular maintenance and calibration. Oil, chemicals, and other contained liquids can be hazardous, due to being poisonous, due to being stored under high pressure, and/or due to being stored at high temperature. Thus, the risks to humans, equipment and the environment are higher when human operators and/or equipment come into contact with the contained liquid. Accordingly, the adoption of level indicators can be cost-prohibitive.

Embodiments of the present disclosure are directed to improved systems and methods for determining the level (e.g., volume) of liquid within a container (e.g., tanks or other vessels). In general, the disclosed embodiments can rely upon analysis of 2D images to identify differences in the outer appearance of the container in order to determine portions of the containers that contain and do not contain the liquid. By using 2D images, level (volume) measurement can be conducted in a remote and contactless manner as compared to existing manual or instrumented inspection techniques.

In one aspect, the temperature of the container material not in contact with the liquid (e.g., approximately above the level of the liquid) can be different from the temperature of the container material in contact with the liquid (e.g., approximately at or below the level of the liquid). Such temperature differences can be distinguished as brightness differences (e.g., lighter/darker) by infrared cameras. The relative lightness and darkness of the outer surface of the container above and below the level of the liquid can depend upon the specific conditions under which the 2D image is acquired (e.g., the composition of the container material, the composition of the liquid, the time of day of 2D image acquisition, ambient temperature, weather conditions, etc.)

In another aspect, when the outer surface of the container material is at least partially transparent, the transmission/ reflection of light from the container can be affected by the presence or absence of the liquid. For example, the container material not in contact with the liquid (e.g., approximately above the level of the liquid) can appear lighter, or in a distinct color, as compared to the container material in contact with the liquid (e.g., approximately at or below the level of the liquid). Such differences can be distinguished by color or grayscale (non-infrared) cameras.

This approach is significantly safer for workers than traditional contact-based measurements, as containers can contain toxic materials. Furthermore, by eliminating the need for contact with a container, accidents that compromise container integrity and incur costs for repair and/or environmental remediation can be avoided. Additionally, various embodiments, the level (volume) measurements can be performed in real-time (e.g., at the time of acquisition of the 2D images), near real-time (e.g., immediately after acquisition of the 2D images), or the 2D images can be stored and later retrieved for use in determining level (volume) measurements.

2D images of a site including containers holding liquid therein that are to be monitored (e.g., tanks containing oil, water, chemicals, etc.) can be acquired in a variety of ways. In one aspect, the 2D images can be acquired by one or more cameras including at least one image sensor (e.g., infrared [IR], visible [RGB], and/or other modalities) to collect image data. In another aspect, the one or more cameras can be equipped with position sensors (e.g., a global positioning system; GPS), allowing correlation between respective 2D images and the position at which the 2D images are acquired.

In a further aspect, the one or more cameras can be positioned in a variety of ways. As an example, the one or more cameras can be mounted to a vehicle, such as manned or unmanned aircraft (e.g., drones) or a ground-based vehicle. In further alternative embodiments, the one or more cameras can be mounted at a fixed position, (e.g., mounted to a post), held by hand, or mounted to another structure fixed in place or moveable object without limit.

As discussed in detail below, a combination of 3D reasoning, 3D to 2D image projections, and image processing techniques can be used to access portion of each container containing the liquid. From knowledge of the total container volume, the liquid volume would be a proportional share of the total. Total container volume can be determined from the site/container data, manufacturer specifications, or from calculations based upon a 3D model generated from "baseline" 2D images during an initial photogrammetry flight, prior to acquisition and analysis of "monitoring" 2D images at a later time. As an example, this can include fitting CAD or other primitives with volume determined by the fit to the containers on the 3D point cloud.

By analyzing 2D monitoring images of the containers acquired after generation of the 3D model from baseline 2D images, intensity differences can be characterized and used to determine the level of liquid within the containers. Beneficially, this approach can be employed with any container material and any liquid, provided that a contrast in temperature or shade of gray/color is present between the container material and the liquid. That is to say, the portion of the container adjacent to the liquid (e.g., at or below the level of the liquid) exhibits a different temperature or shade of gray/color than the remainder of the container distanced from the liquid (e.g., above the level of the liquid).

As an example, a drone and a sensor kit mounted on the drone can be employed to monitor containers remotely and regularly or on demand. Data from sensor kit can be a plurality of images, e.g., a video or a collection of individual images, viewing the containers from different viewpoints.

The containers can be on-boarded and a more extensive visual data collection can be run to extract a 3D baseline representation (model) from the plurality of images using photogrammetry techniques (e.g., at least one of visible and IR modality). Images acquired at human-visible light wavelengths can be represented in a variety of ways. Examples can include, but are not limited to, color (e.g., any color model such as RGB, CMY, CMYK, etc.), monochrome, grayscale, black and white, and any combination thereof. After this onboarding step, characteristics of the containers (e.g., geo-location, shape, dimensions, volume, etc.) can be registered and the 3D model of the site built.

The containers at a given site can be monitored via subsequent routine inspection (e.g., 2D images acquired from one or more cameras mounted to an aircraft) as required by the nature of the volumetric inspection or as part of other inspections. Routine inspection images can be also registered to the baseline 3D model using photogrammetry techniques, enabling projection of the 3D representation of the containers into subsequent 2D inspection images. These projections in 2D domain, as well as some 2D image processing techniques, can be used to access portion of each container in a given inspection image.

Additional image processing techniques can be used in IR domain to determine "darker" portion of the containers indicating the colder liquid in the container. However, it can be understood that, in alternative embodiments, the "brighter" portion of the containers can indicate the wanner liquid within the container. The height of this dark region along the container's vertical boundary in the 2D image can give the ratio of liquid height to total height of the container (fullness in vertical (Z) direction). Knowing the total container volume (e.g., from any one or more of the site/container data, calculating the total container volume from an on-boarded 3D model and container fitting, obtaining the total container volume from prior knowledge such as a manufacturer specification, etc.), and the geometry of the container, the measured liquid volume can be calculated from the vertical boundary in the 2D image. Under circumstances where the container cross-section is approximately constant in the height (Z) direction (e.g., a cylindrically shaped container oriented vertically), the liquid volume can be proportional to the height of the liquid held within the container. Under circumstances where the container is does not possess a constant cross-section in the height (Z) direction (e.g., a cylindrically shaped container oriented horizontally), the liquid volume can be calculated from the total volume of the container, the geometry (e.g., dimensions) of the container, and the height of the liquid held within the container.

In certain embodiment, the one or more 2D monitoring images of a given container can be acquired at different angles, distances, image modalities (IR versus color). Accordingly, analysis of the liquid level/volume of such containers can be combined (e.g., averaged) to obtain a single, consolidated assessment of liquid level/volume. Such consolidated assessment can provide an improved measurement of liquid level/volume as compared to a measurement based upon a single 2D monitoring image.

Additionally, it is recognized that there can be multiple containers side by side at various facilities, and that these adjacent containers can at least partially occlude acquisition of an image of a given container. Accordingly, in some embodiments, a depth analysis can be performed to remove parts of target container regions in a given 2D baseline image that are occluded by adjacent containers or other objects in that viewpoint located between the camera and the container in question.

In an embodiment, a method is provided. The method can include receiving, by one or more processors, one or more 2D images of a site including one or more containers configured to hold a liquid, the 2D images being acquired at a first time. The method can also include identifying, by the one or more processors, a container within the one or more of the 2D images. The method can further include selecting, by the one or more processors, an identified container within the one or more 2D images for volumetric analysis based upon a degree of occlusion of its front facing surface. The method can additionally include classifying, by the one or more processors, a portion of the selected container containing the liquid. The method can further include determining, by the one or more processors, the volume of liquid held within the container based upon the classified portion.

In another embodiment, the method can further include, by the one or more processors, determining a ratio of a height of the liquid held within the selected container to a total height of the selected container, and determining a volume of the liquid held within the selected container based upon the determined ratio and a total volume of the selected container.

In another embodiment, the method can further include receiving, by the one or more processors, a 3D model representing the site at a second time prior to the first time.

In another embodiment, the one or more 2D images can be at least one of infrared (IR) images, color images, gray-scale images, or a combination thereof.

In another embodiment, the method can further include, by the one or more processors, determining a boundary of the identified container within the one or more 2D images based upon the 3D model, isolating a front-facing surface of the identified container within the one or more 2D images, determining the degree of occlusion of the front-facing surface, and selecting the identified container within the one or more 2D images when the degree of occlusion is less than a predetermined threshold amount.

In another embodiment, the method can further include generating, by the one or more processors, a processed image by at least one of deskewing or dewarping the isolated front-facing surface of the selected container prior to classifying the portion of the selected container holding the liquid.

In another embodiment, the method can further include selecting, by the one or more processors, a center portion of the processed image prior to classifying the portion of the selected container holding the liquid.

In another embodiment, the method can further include generating, by the one or more processors, a processed image by binarizing the isolated front-facing surface of the selected container prior to classifying the portion of the selected container holding the liquid.

In another embodiment, the container can be a cylinder.

In another embodiment, the method can further include determining, by the one or more processors, the ratio by a linear regression of the ratio of the height of the liquid held within the container to the total height of the selected container as a function of horizontal position.

In an embodiment, a computer program product comprising a non-transitory machine-readable medium is provided. The non-transitory machine-readable medium can store instructions that, when executed by one or more processors, cause the one or more processors to perform one or more operations. The operations can include receiving, by one or more processors, one or more 2D images of a site including one or more containers configured to hold a liquid, the 2D images being acquired at a first time. The operations can also include identifying, by the one or more processors, a container within the one or more of the 2D images. The operations can further include selecting, by the one or more processors, an identified container within the one or more 2D images for volumetric analysis based upon a degree of occlusion of its front facing surface. The operations can additionally include classifying, by the one or more processors, a portion of the selected container containing the liquid. The operations can further include determining, by the one or more processors, the volume of liquid held within the container based upon the classified portion.

In another embodiment, the operations can include determining a ratio of a height of the liquid held within the selected container to a total height of the selected container, and determining a volume of the liquid held within the selected container based upon the determined ratio and a total volume of the selected container.

In another embodiment, the operations can include determining the ratio by a linear regression of the ratio of the height of the liquid held within the container to the total height of the selected container as a function of horizontal position.

In another embodiment, the operations can include receiving a 3D model representing the site at a second time prior to the first time.

In another embodiment, the one or more 2D images can be at least one of infrared (IR) images, color images, gray-scale images, or a combination thereof.

In another embodiment, the operations can include determining a boundary of the identified container within the one or more 2D images based upon the 3D model, isolating a front-facing surface of the identified container within the one or more 2D images, determining the degree of occlusion of the front-facing surface, and selecting the identified container within the one or more 2D images when the degree of occlusion is less than a predetermined threshold amount.

In another embodiment, the operations can include generating a processed image by at least one of deskewing or dewarping the isolated front-facing surface of the selected container prior to classifying the portion of the selected container holding the liquid.

In another embodiment, the operations can include selecting a center portion of the processed image prior to classifying the portion of the selected container holding the liquid.

In another embodiment, the operations can include generating a processed image by binarizing the isolated front-facing surface of the selected container prior to classifying the portion of the selected container holding the liquid.

In another embodiment, the container can be a cylinder.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Industrial sites can store liquids, such as oil or chemicals, within containers such as tanks for use during operations. The level of liquid within these containers can be periodically monitored to determine the volume of liquid contained therein. However, existing approaches for liquid level monitoring can be harmful, labor intensive, and/or time consuming, either due to the need for significant human activity, or use of sensors that can be costly to purchase and maintain. Accordingly, systems and methods for improved liquid level monitoring of containers are provided herein to address these deficiencies. As discussed in detail below, 2D images of containers can be acquired as a baseline during the onboarding using one or more cameras. 3D models of the containers can be further generated from the 2D baseline images and used to assist determination of the volume of the containers during the subsequent monitoring or on demand. When the containers are subsequently monitored, additional 2D images can be acquired. Characteristics of the containers derived from the 3D model (e.g., shape, location, etc.) can be employed to identify the containers within the 2D monitoring images.

During inspection, the 2D monitoring images can be further analyzed. As an example, the analysis of a respective 2D monitoring image can isolate selected containers from the remainder of the 2D monitoring image, determine suitability of a selected container for level measurement, and the level measurement itself. Multiple level measurements can be acquired from different 2D images under different viewing angles and/or observation distances for a selected container and combined for further accuracy. In this manner, the time and cost to perform level measurements can be reduced, with increased accuracy.

Embodiments of the present disclosure describe systems and methods for liquid level sensing in the context of containers such as oil tanks positioned on a well pad. However, it can be understood that embodiments of the disclosure can be employed for measuring the level of liquid retained within any container at any location without limit.

Figure 1:
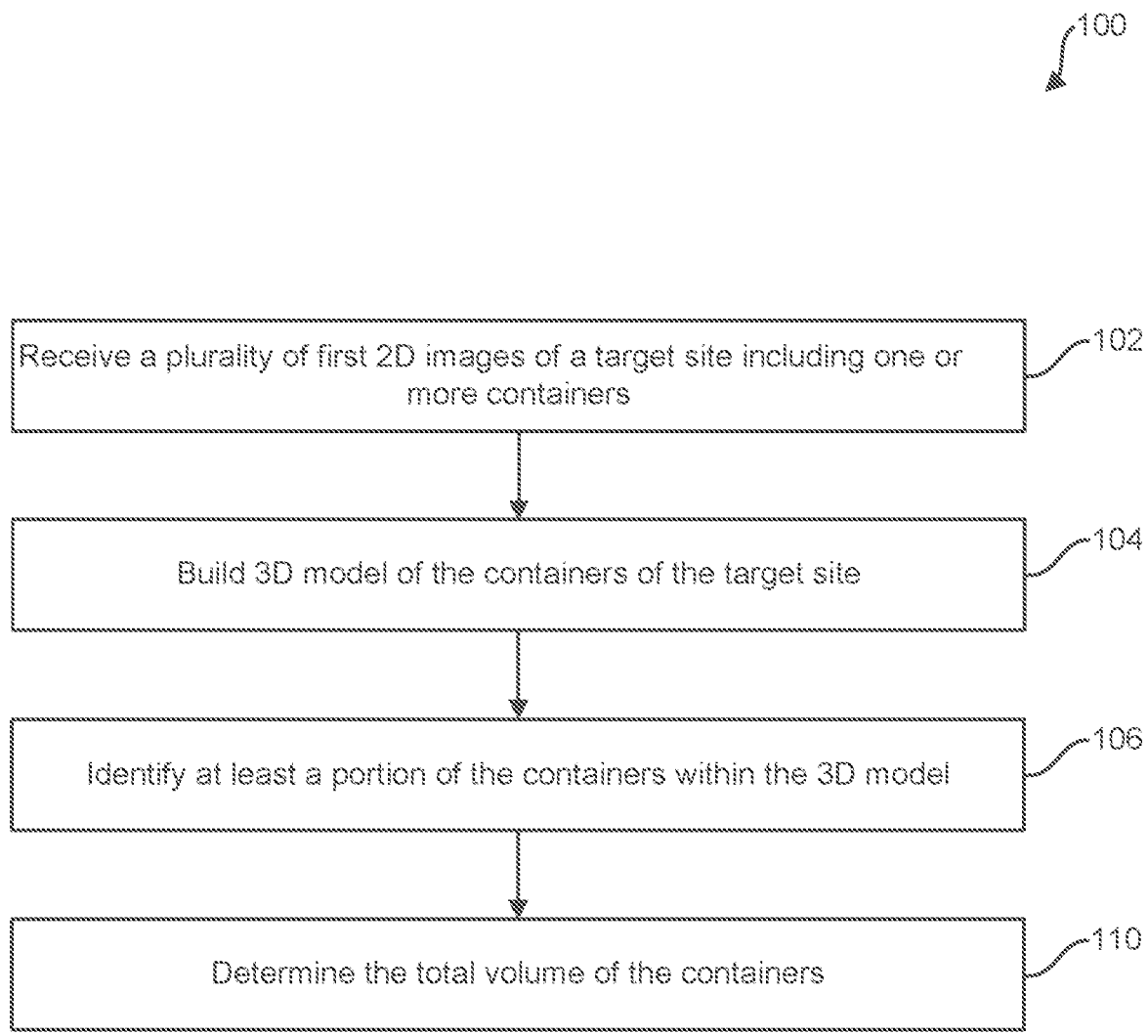
FIG. 1 is a flow diagram illustrating one embodiment of a method for determining the total volume of containers within a target site.

FIG. 1 is a flow diagram illustrating one embodiment of a method 100 for determining the total volume of a container configured to hold a liquid (e.g., a tank). As shown, the method 100 includes operations 102-110. However, it can be understood that, in alternative embodiments, one or more of these operations can be omitted and/or performed in a different order than illustrated.

In operation 102, a plurality of first 2D images of a target site including one or more containers configured to hold a liquid can be received by a computing device of a liquid level measurement system. As an example, the target site can be an oil well pad and the containers can be tanks holding oil or another liquid of interest.

Figure 2A:
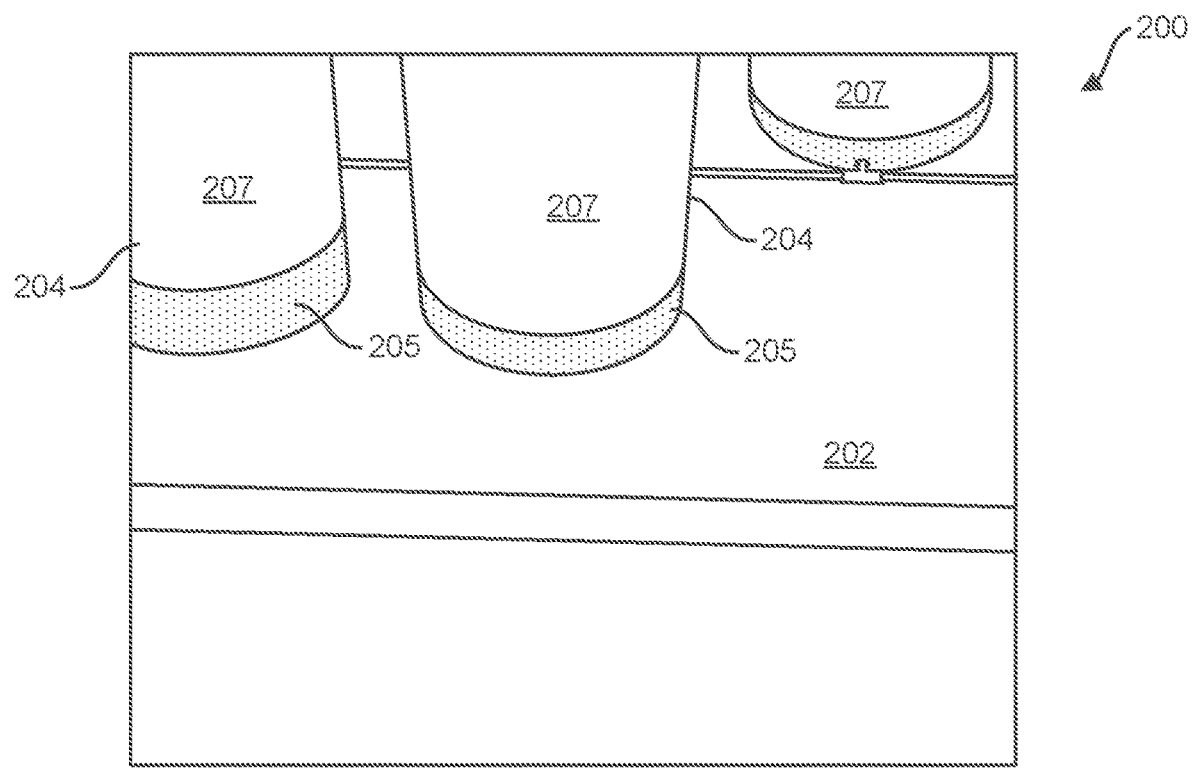
FIG. 2A is schematic diagram illustrating a representation of a two-dimensional (2D) image of a target site containing containers to be monitored.

The first 2D images, also referred to as baseline 2D images herein, can be acquired in a variety of ways. The two or more baseline 2D images, can be acquired by a camera. The camera can be moved into position and supported. As an example, the camera can be mounted to a vehicle (e.g., an aircraft, a ground-based vehicle, etc.), a fixedly mounted camera, a hand-held camera, or combinations thereof. In one embodiment, the baseline 2D images can be acquired by at least one camera mounted to an aerial vehicle (e g , a manned airplane, a helicopter, a drone, or other unmanned aerial vehicle). The camera can be configured to acquire infrared images, visible images (e.g., grayscale, color, etc.), or combination thereof. The camera can also be in communication with a position sensor (e.g., a GPS device) configured to output a position, allowing the baseline 2D images to be correlated with the position at which they are acquired. An example of an acquired baseline 2D image is illustrated in FIG. 2A. It can be appreciated that the two or more baseline 2D images can be acquired by a single camera or multiple cameras, without limit.

In operation 104, at least a portion of the baseline 2D images and position information can be analyzed to generate a 3D model of the target site (e.g., a well pad). An example can be found at en.wikipedia.org/wiki/3D_reconstruction_from_multiple_images, which is hereby incorporated by reference in its entirety. The analysis can include a camera calibration operation in which the parameters of a pinhole camera model approximating the camera that acquired the baseline 2D images can be estimated (e.g., from intrinsic and/or extrinsic parameters of the camera). This calibration can determine which incoming light is associated with each pixel of respective ones of the baseline 2D images.

Subsequently, the position information associated with each of the baseline 2D images can be used to determine matches between respective baseline 2D images. In this manner, the position of the matched elements can be triangulated in 3D space to determine the depth associated with each pixel of the baseline 2D images. This depth determination allows a depth map to be constructed for each of the baseline 2D images. Once multiple depth maps are obtained, they can be combined in a registration operation to create a final 3D point cloud by calculating depth and projection out of the camera. The 3D point cloud is a set of points in space representing the 3D shapes/objects captured within the baseline 2D images. In alternative embodiments, a 3D model can be built using LIDAR scanner or other technologies.

In operation 106, at least a portion of the containers (e.g., tanks) can be identified on the 3D model. In one example, 3D primitives can be fit to the 3D point cloud. The 3D primitives can be basic geometric shapes including, but not limited to, cylinders, cubes, pyramids, cones, spheres, tori, and any combination thereof.

In another example, an annotation technique can be employed to characterize respective containers. In general, image annotation, also referred to as tagging, is a process that can be employed in machine learning or deep learning (e.g., artificial neural networks) to label or classify features of interest within the baseline 2D images. In the context of the present embodiments, one or more characteristics of respective containers can be classified, including but not limited to, type of container, shape, dimensions (e.g., height, diameter, cross-sectional area, etc.).

Figure 2B:
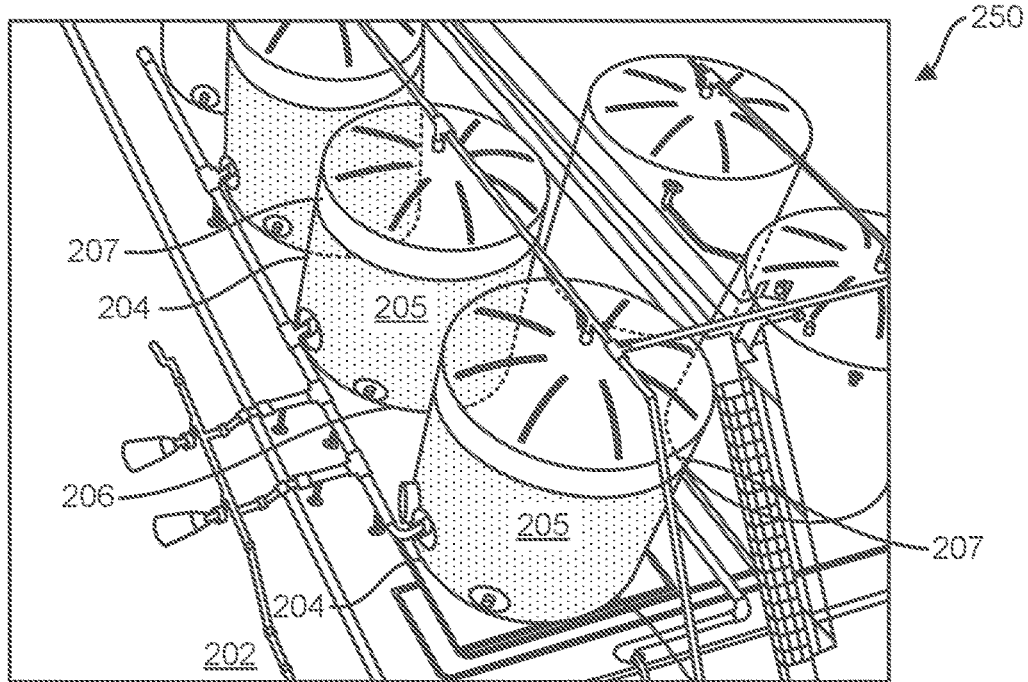
FIG. 2B is a schematic diagram illustrating a representation of a two-dimensional (2D) image of a target site including overlaid (partially occluded) containers.

In operation 110, a total volume of respective containers can be determined. As an example, assuming that the containers are cylindrical, cylindrical contours can be fit to respective containers. With knowledge of the position of the containers and the position at which the baseline 2D images are acquired, the height and diameter of the containers can be determined. From these dimensions, total volume of respective containers can be calculated. In another example, the total volume can be directly input (e.g., from manufacturer specifications, other independent measurements, etc.) Schematic diagrams representing baseline 2D images of sites 200, 204 including respective containers 204 (e.g., cylindrical containers) are shown in FIG. 2A and FIG. 2B. Further illustrated on respective containers 204 is a line indicating the level of the liquid and dividing the containers between a liquid holding portion 205 and an empty or non-liquid holding portion 207. It can be appreciated that, while determining the volume of cylindrically shaped containers is discussed above, the volume of containers having other geometric shapes can be similarly determined.

Figure 3:
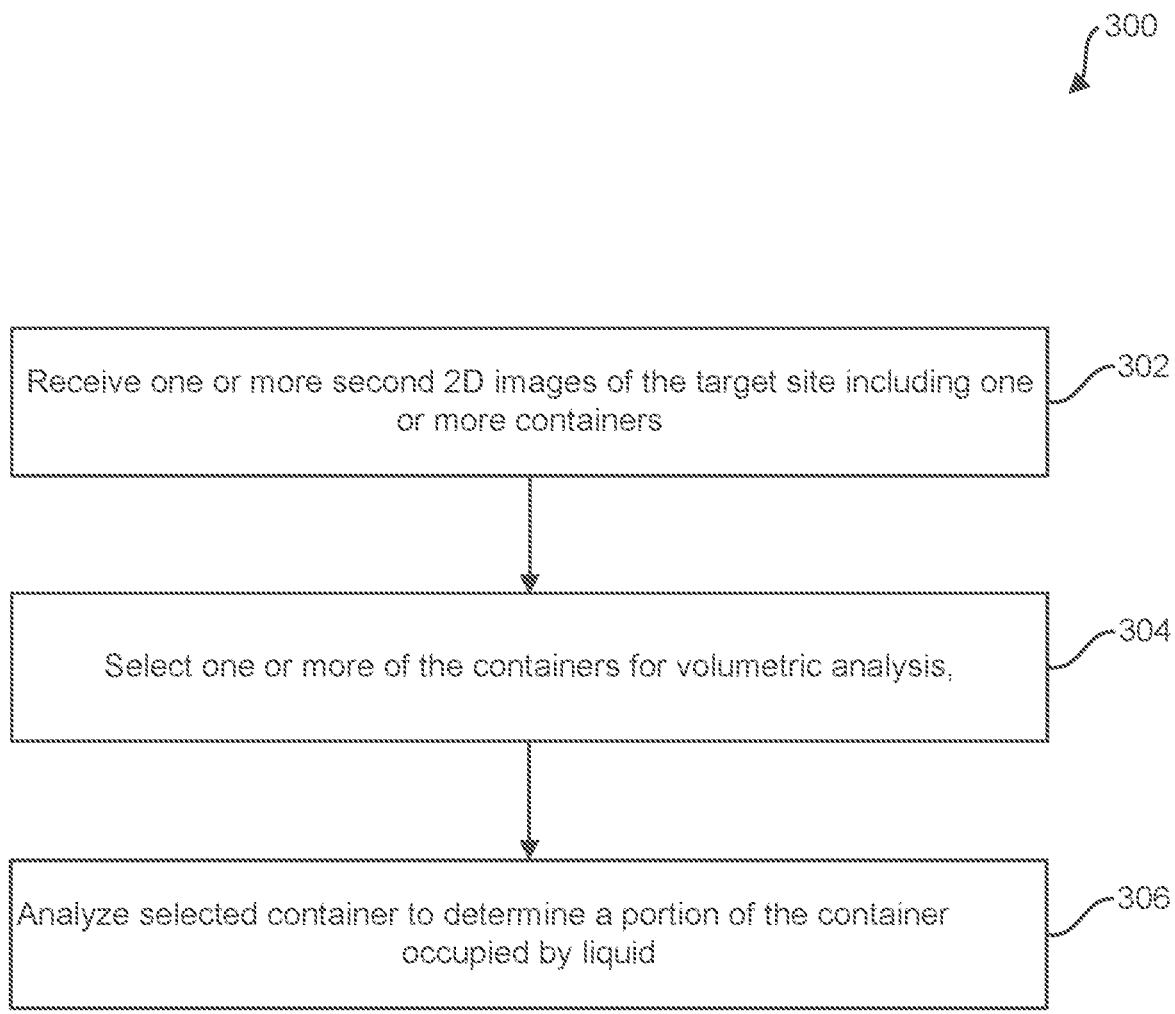
FIG. 3 is a flow diagram illustrating one embodiment of a method for determining a volume of a container occupied by liquid.

FIG. 3 is a flow diagram illustrating one embodiment of a method 300 for characterizing an amount of liquid retained within a container 204 (e.g., the fraction of the total volume of the container occupied by the liquid). As shown, the method 300 includes operations 302-306. However, it can be understood that, in alternative embodiments, one or more of these operations can be omitted and/or performed in a different order than illustrated.

In operation 302, one or more second 2D images of the target site including one or more containers 204 (e.g., tanks) can be received by the computing device of the liquid level measurement system. The one or more second 2D images, also referred to as monitoring images herein, can be acquired by a camera in a manner similar to that discussed above with respect to acquisition of the baseline 2D images (e.g., acquired by one or more of a camera mounted to an aircraft that is manned or unmanned, a camera mounted to a ground-based vehicle, a fixedly mounted camera, a hand-held camera, or combinations thereof).

In operation 304, one or more of the containers 204 can be selected for volumetric analysis. As discussed below, selection can include identification of a container 204 within the one or more 2D monitoring images, determination of a front-facing surface of respective ones of the containers 204, isolation of the front-facing surface of the container 204, and determination whether the container 204 is to be included or excluded from consideration.

Figure 4A:
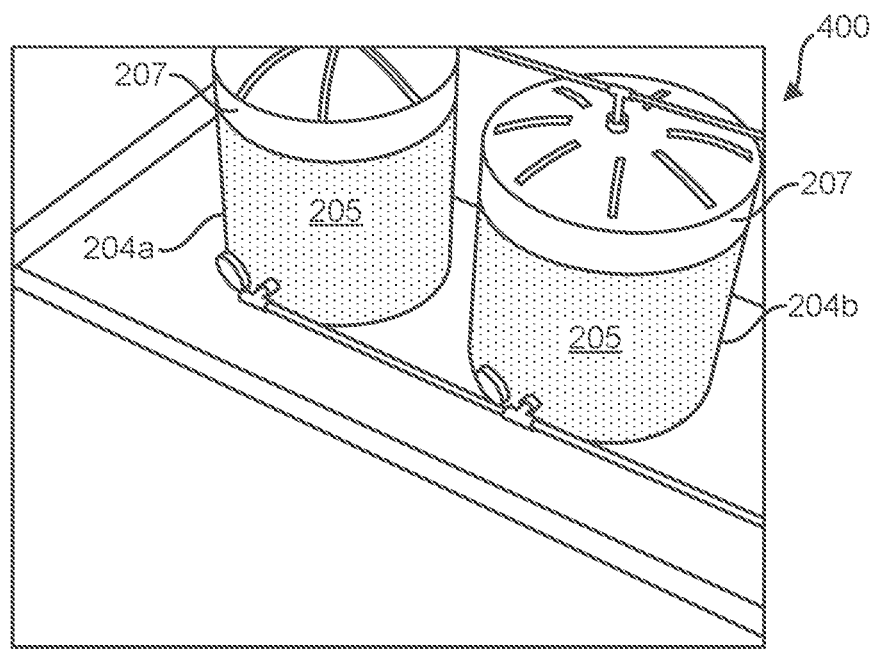
FIG. 4A is a schematic diagram illustrating a representation of a two-dimensional (2D) image of a target site containing two containers (left and right) to be monitored.

FIG. 4A is a schematic diagram illustrating a representation of a 2D monitoring image of a target site 402 including two containers (e.g., tanks) 204a, 204b for monitoring. By use of contours 206 (see FIG. 2B) of the containers 204 projected into 2D from the 3D model, individual ones of the containers 204 within the one or more 2D monitoring images can be identified. As shown, the contour 206 includes a front-facing surface 402 and a top facing surface 404. Once a container 204 is localized, the front-facing surface 402 of that container 204 can be identified. Examples of such identification can include, but are not limited to, a threshold analysis or other image analysis technique. In a threshold analysis, pixels having a pixel value within a predetermined range can be designated as belonging to the front-facing surface 402, while pixels having a pixel value outside of the predetermined range can be designated as not belonging to the front-facing surface. Other image analysis techniques can include using a template front-facing surface and identifying the front-facing surface of a container to be an object that matches the template front-facing surface within a predetermined geometric tolerance.

Figure 4B:
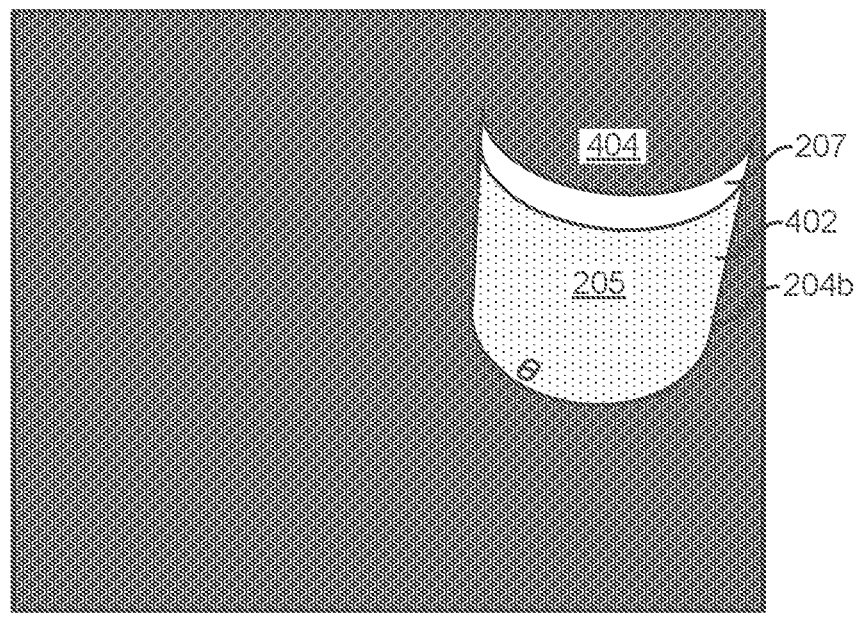
FIG. 4B is a schematic diagram illustrating a front-facing surface of the right container of FIG. 4A that is cropped and isolated from the remainder of FIG. 4A.

Once the front-facing surface 402 of a selected container (e.g., 204b) is determined, its boundary can also be determined. The boundary of the front-facing surface 402 can be determined by taking the contour 206 of the container 204b and eliminating the top facing surface 404 from the contour 206. The front-facing surface 402 can be further isolated from the remainder of the 2D monitoring image(s), as shown in FIG. 4B. As an example, the front-facing surface 402 can be isolated in a segmentation operation. In one instance, a predetermined pixel value (e.g., black) can be assigned to pixels of the 2D image outside of the contour 206 of the front-facing surface 402).

Figure 5A:
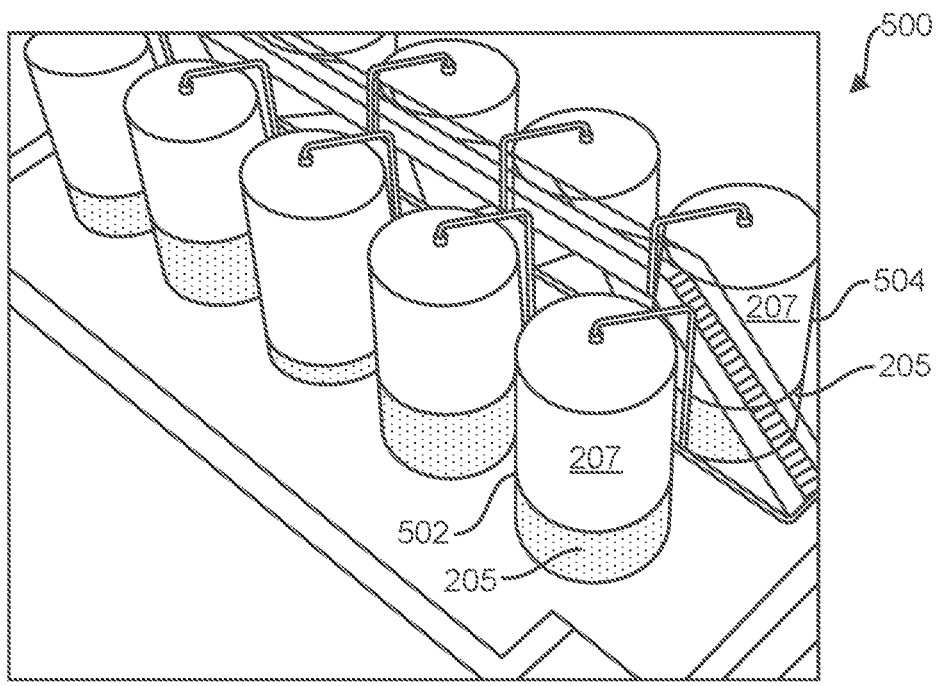
FIG. 5A is a schematic diagram illustrating a representation of a 2D monitoring image of a target site containing non-occluded and partially-occluded containers to be monitored.

In one embodiment, a determination can be made whether a container 204 is partially occluded. In general, the degree of occlusion of a container 204 can be determined by considering the relative 3D locations of individual containers 204, the orientation of the camera with respect to the scene, used for 3D to 2D image projection. If not, the container 204 can be immediately included for level measurement analysis. FIG. 5A is a schematic diagram illustrating one exemplary embodiment of another site 500 with multiple containers 204 including a fully visible container (labeled as container 502) in a front row of containers 204 and a partially occluded container (labeled as container 504) in a rear row of containers 204.

Figure 5B:
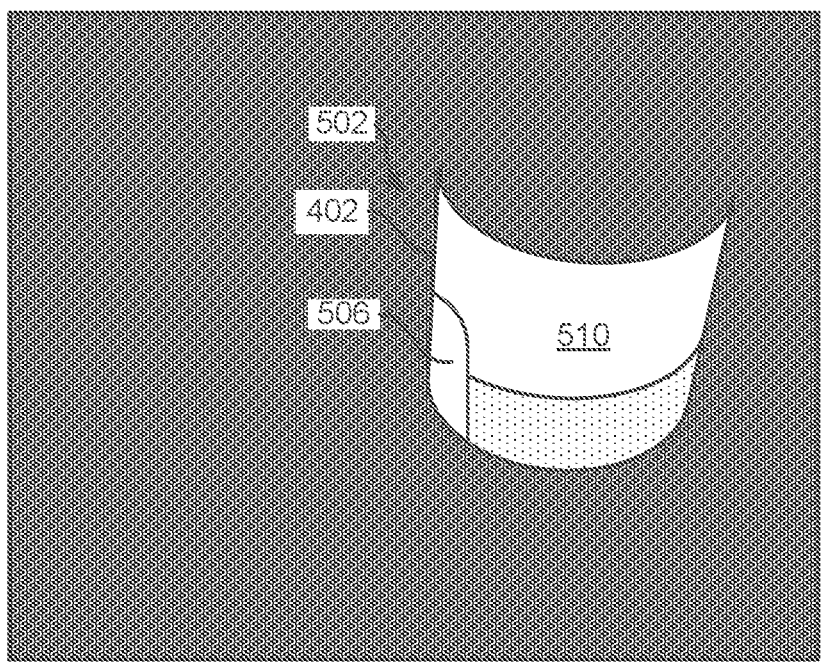
FIG. 5B is a schematic diagram illustrating a representation of the 2D monitoring image of FIG. 5A that is cropped to show the front-facing surface of a partially occluded container.

In an embodiment, a degree of occlusion of a container 204 can be measured to determine whether that container 204 should be included in the level measurement or not. FIG. 5B is a schematic diagram in which the partially occluded container 504 has been cropped to isolate and display only the front-facing surface of the partially occluded container 504. As shown, the front facing surface 402 includes an occluded portion 506 and non-occluded portion 510. In an embodiment, the occluded portion 506 can have a visually different appearance (e.g., color, intensity, etc.) than the non-occluded portion 510. In one embodiment, the partially occluded container 504 can be included in level volume measurement if a fraction (e.g., an area fraction) of the occluded portion 506 of the front-facing surface 402 is less than a predetermined threshold fraction.

In operation 306, the container 204 selected for level measurement within the one or more 2D monitoring images can be analyzed. In one aspect, the analysis can include pre-processing of the isolated front facing surface 402 of the container 204. Beneficially, the pre-processing can facilitate avoidance of artifacts that can introduce error and/or complicate the level measurement analysis. As discussed in detail below, examples of pre-processing can include one or more of deskewing, dewarping, selection of a portion of the isolated front-facing surface, and binarization. It can be appreciated that this list of pre-processing operations is not exhaustive and other pre-processing operations can be performed without limit.

Figure 6:
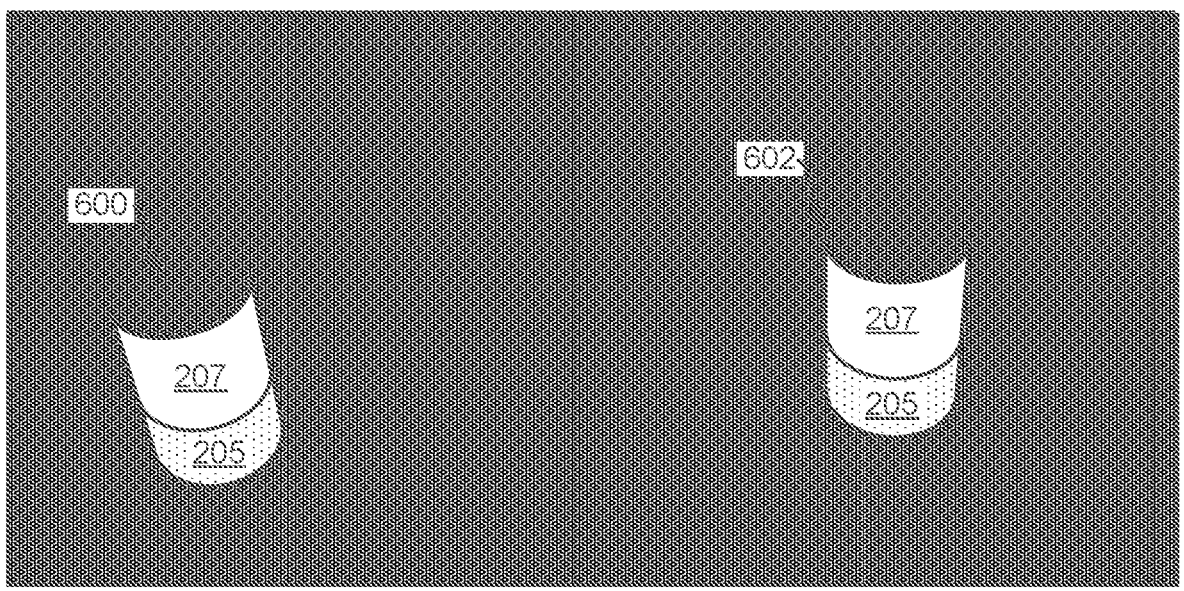
FIG. 6 is a schematic diagram illustrating a representation of a 2D monitoring image including an isolated front-facing surface of a container as originally captured and after deskewing.

An example of deskewing is illustrated in FIG. 6. A skewed container 600 is shown on the left. It can be observed that sides of the skewed container 600 are not substantially vertical (e.g., within a predetermined tolerance of vertical). A corresponding deskewed front-facing container 602 is illustrated on the right, where the skewed container 600 has been rotated such that its sides are substantially vertical.

Figure 7A:
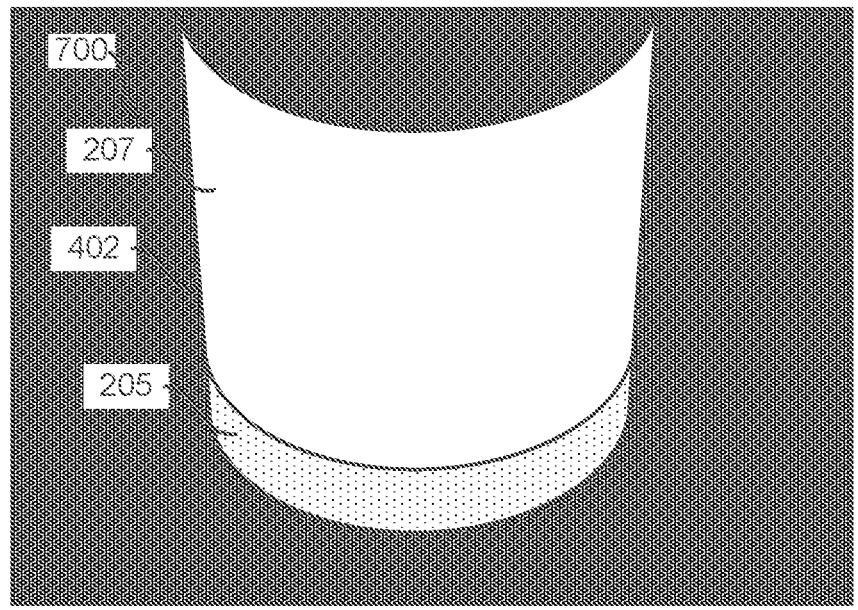
FIG. 7A is a cropped and deskewed image.
Figure 7B:
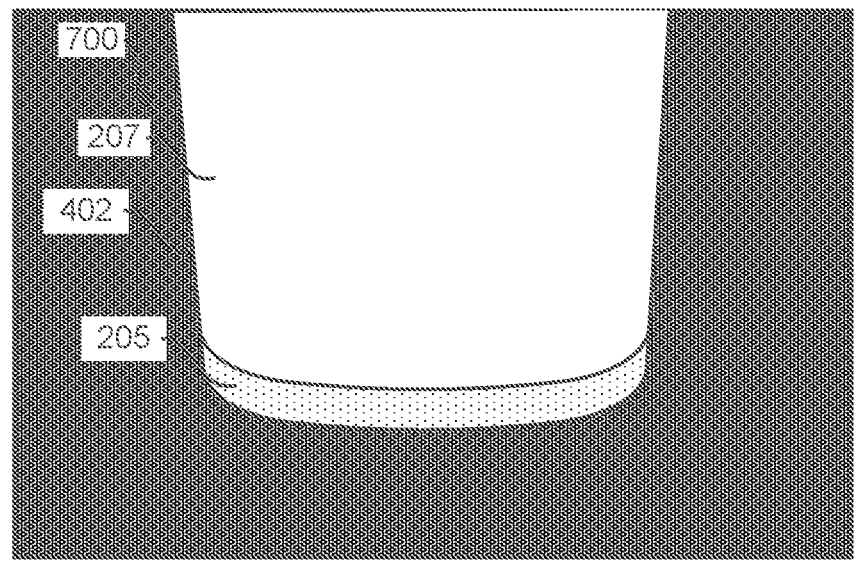
FIG. 7B is the image of FIG. 7A after dewarping.

Examples of dewarping a deskewed image of a selected container 204 are illustrated in the schematic diagrams of FIGS. 7A-7B. FIG. 7A illustrates a representation of a deskewed container 700 prior to dewarping. FIG. 7B illustrates representation of a dewarped and deskewed container 702. As shown, the dewarping process approximates the appearance of the container 204 if the front-facing surface 402 were flat, rather than curved. In certain embodiments, use of the deskewed and dewarped container 702 can simplify the level measurement further, as discussed below.

Figure 7C:
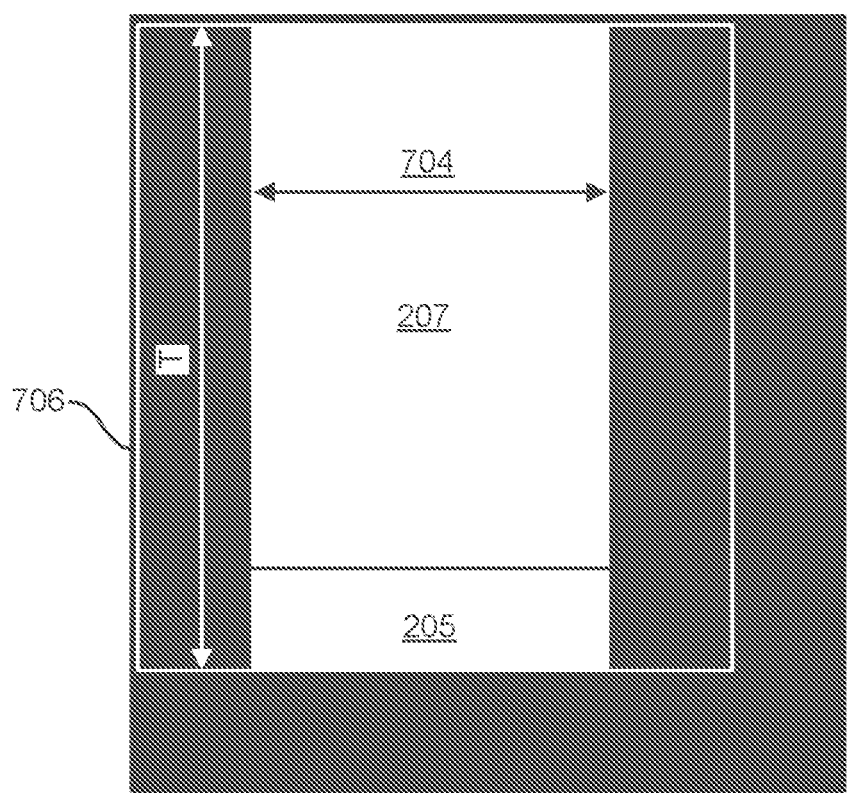
FIG. 7C is a center portion of the image of FIG. 7B.

It can be appreciated that the liquid level of a deskewed and dewarped container 702 can be more representative of the actual liquid level, and therefore more accurate, near the horizontal center of the container 204, as compared to locations at or near the outermost horizontal edges of the container 204. Accordingly, in certain embodiments, a center section 704 of the deskewed and dewarped container 702 can be selected for use in the level measurement analysis. As an example, FIG. 7C is a schematic diagram illustrating the deskewed and dewarped container 702 of FIG. 7B and the corresponding center section 704. An overlaid box 706 illustrates the original extent of the front-facing surface 402 of FIG. 7B, showing the edge portions that have been removed.

The center section 704 of the deskewed and dewarped container 702 can be selected in a variety of ways. In one aspect, the center section 704 can be distanced from the opposing sides of the container 204 (e.g., the deskewed and dewarped container 702) by a predetermined distance. In another aspect, the center section 704 can be distanced from the opposing sides of the container 204 by a predetermined percentage of the width (horizontal extent) of the container 204 (e.g., between about 1 to about 50%, such as about 1%, about 5%, about 10%, about 15%, about 20%, about 25%, about 30%, about 35%, about 40%, about 45%, about 50%).

In further embodiments, pre-processing can optionally include a binarization, where a grayscale or color image is converted to black and white. Black levels can be assigned with respect to a threshold pixel value (e.g., white when the pixel value is less than the threshold and black when the pixel value is greater than the threshold value). Thus, the area of the liquid can be represented as black and the area of the empty vessel can be represented as white. As indicated above, the use case of the "reverse" temperature, when the liquid portion is brighter, is also contemplated.

Figure 7D:
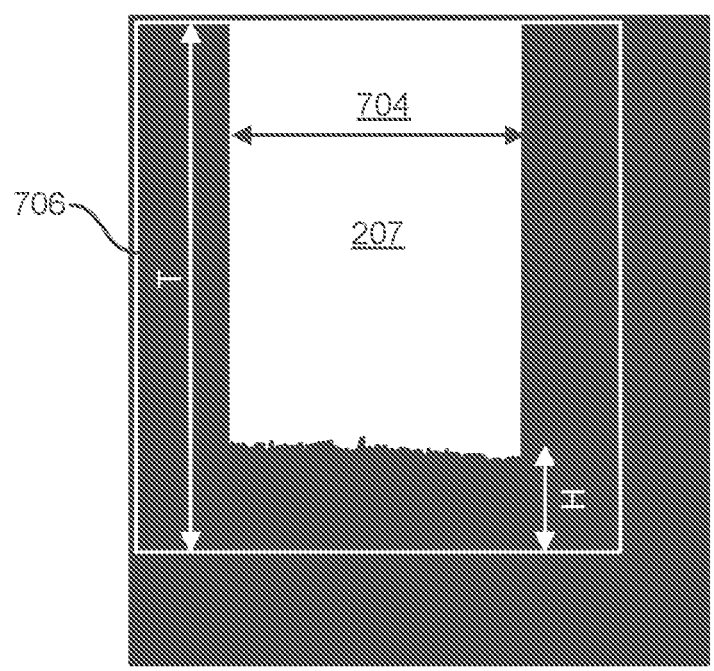
FIG. 7D is a center portion of the image of FIG. 7B.

FIG. 7D illustrates one example of binarization, where the actual determined height of the liquid is shown in black and the remaining empty portion of the container 204 is shown in white. Embodiments of binarization can be performed without other pre-processing operations or in combination with one or more pre-processing operations discussed above (e.g., dewarping, deskewing, center section selection, etc.)

In certain embodiments, the level measurement analysis can be performed on images of the front-facing surface of the container, with or without pre-processing as discussed above, to determine the level of the liquid within the container. The level can be determined in a variety of ways. Examples can include, but are not limited to, a threshold analysis or other image analysis technique. In a threshold analysis, pixels having a pixel value within a predetermined range can be designated as belonging to the liquid, while pixels having a pixel value outside of the predetermined range can be designated as not belonging to the liquid. Alternatively, pixels having a pixel value within a predetermined range can be designated as not belonging to the liquid, while pixels having a pixel value outside of the predetermined range can be designated as belonging to the liquid. The predetermined threshold can be based upon the type of image (e.g., color or grayscale). Other image analysis techniques can include use of pixel value gradients and/or contrast to identifying the liquid level of a selected container, where a predetermine difference in pixel values between adjacent pixels and/or over a predetermined number of pixels can be employed to identify the liquid level. It can be appreciated that other image identification/classification techniques can be employed to identify the liquid level without limit.

Figure 8:
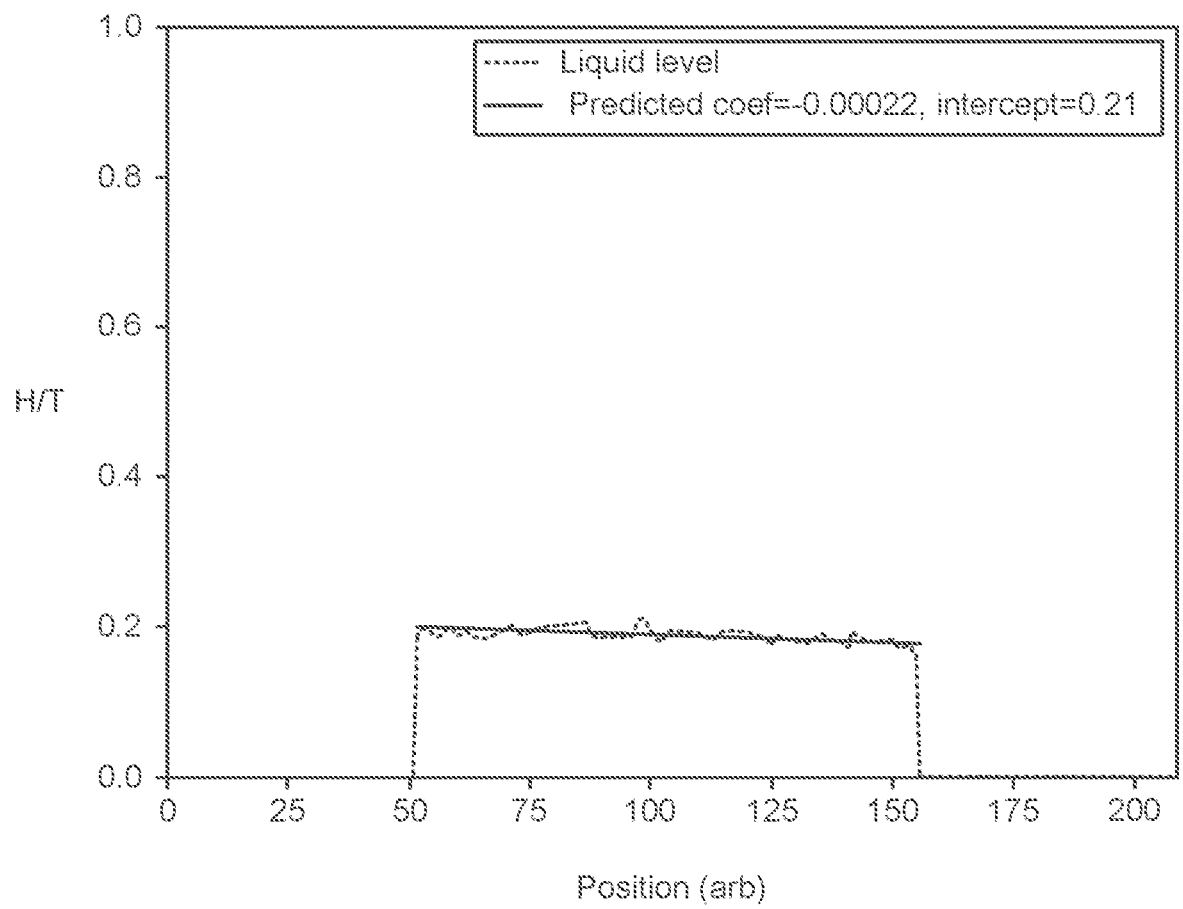
FIG. 8 is a plot of liquid fraction as a function of horizontal position for a container measured according to the method of FIG. 3.

In certain embodiments, the level measurement (and ratio of liquid height to total volume H/T) can be determined at a single horizontal location of the container. In alternative embodiments, the level measurement can be determined a multiple horizontal locations of the container. In the latter case, a linear regression of the height (and ratio of liquid height to total volume H/T) as a function of horizontal position can be performed to determine a final measurement of height H of the liquid, as shown in FIG. 8.

In one embodiment, a ratio of the liquid height H to the total vessel height T can provide a measure of the filled volume of the container. As an example, with the assumption that the container is a cylinder having approximately constant cross-section in the height (Z) direction (e.g., a cylindrically shaped container oriented vertically), with knowledge of the total volume of the cylinder, there is a proportionality between the height of the liquid and the volume of the liquid held within the container. Thus, the product of the determined ratio and the total container volume yields the volume of liquid held within the container. As discussed above, the total height of the container can be determined from the on-boarded 3D model, from a manufacturer specification, from user input, or any combination thereof.

In alternative embodiment, the container cross-section can be non-constant in the height (Z) direction (e.g., a cylindrically shaped container oriented horizontally). Under this circumstance, the liquid volume can be calculated from the total volume of the container, the geometry (e.g., dimensions) of the container, and the height of the liquid held within the container. Similar to the example above, the total height of the container can be determined from the on-boarded 3D model, from a manufacturer specification, from user input, or any combination thereof.

Figure 9:
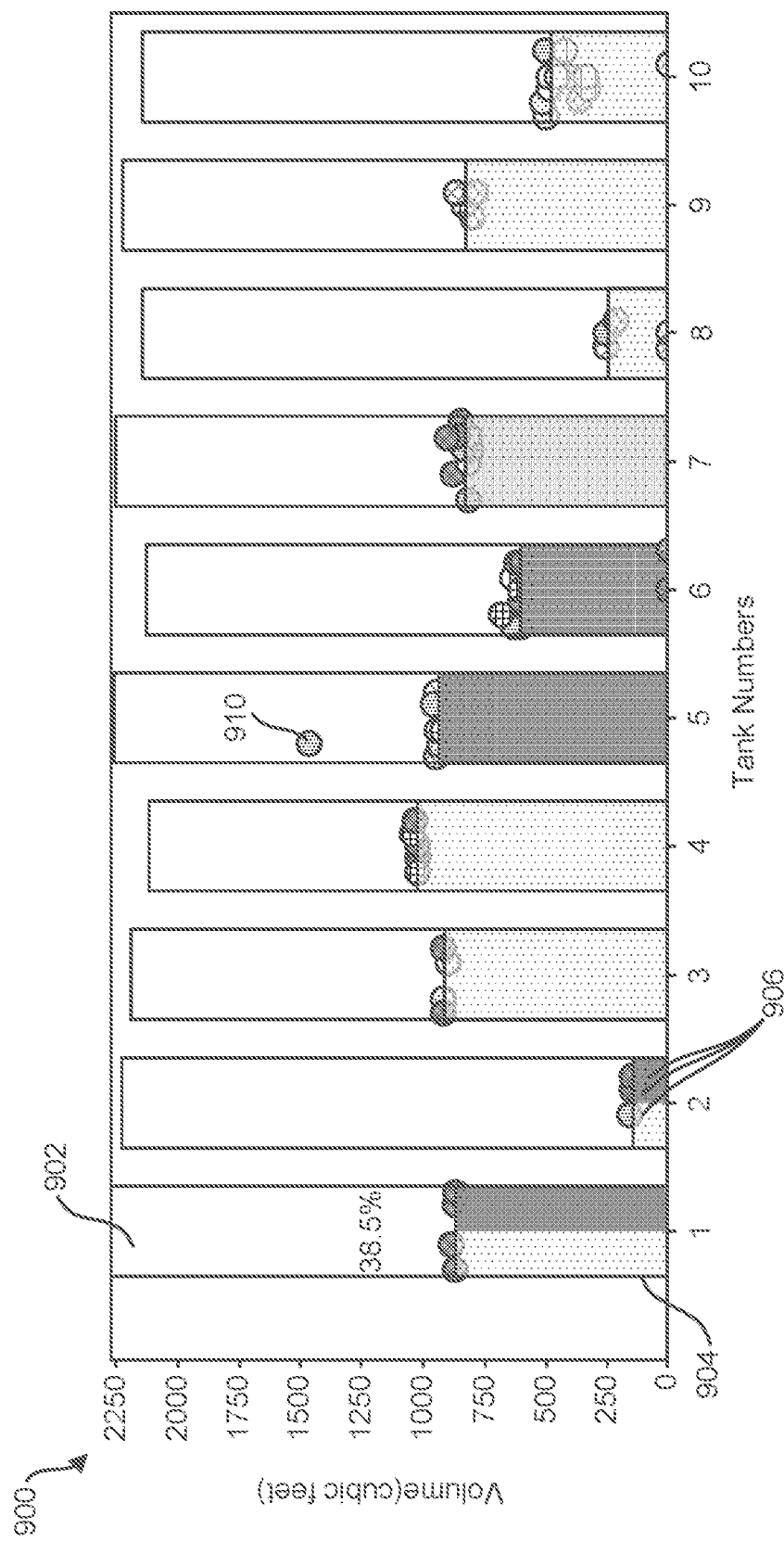
FIG. 9 is a plot illustrating exemplary embodiments of respective volume measurements for a plurality of containers.

Under some circumstances, a given container can be captured in multiple ones of the 2D monitoring images. Thus, multiple measurements of the fill and the attendant volume of the container can be made. These measurements can be compared to one another and outliers can be eliminated if necessary. The remaining measurements can be combined (fused) to provide greater accuracy and robustness of the measurement (e.g., averaged). The ability to acquire and/or combine multiple liquid volume measurements can be an important contribution providing robustness and redundancy Examples of such measurements are illustrated in FIG. 9. As shown, volume is represented as a bar chart 900 for respective containers. A bar outline 902 represents a total volume of respective containers and the overlaid shaded bars 904 representing a combination (e.g., average) of individual measurements (e.g., acquired from respective 2D monitoring images). The individual measurements are shown as circles 906. Individual measurements that are determined to be outliers 910 can be omitted from the combined liquid volume measurement.

Exemplary technical effects of the methods, systems, and devices described herein include, by way of non-limiting example improved level sensing measurements. Speed of measurement acquisition can be significantly increased compared to conventional, manual inspection by rapid computer-based image analysis as well as analysis of multiple containers substantially simultaneously. By avoiding the need for interaction (e.g., climbing and entry) of human inspectors with monitored containers, the risk of human injury is reduced. Accuracy of image analysis is expected to be high and can be further improved by use of cameras with higher spatial resolution (e.g., RGB cameras).

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. "Approximately," "substantially", or "about" can include numbers that fall within a range of 1%, in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method, comprising:
acquiring, by one or more cameras, one or more 2D images of a site including one or more containers configured to hold a liquid, the 2D images being acquired at a first time;
identifying, by one or more processors, a container within the one or more of the 2D images;
determining, by the one or more processors, a front facing surface of the identified container;
determining, by the one or more processors, an occluded portion of the front facing surface of the identified container;
determining, by the one or more processors, that the occluded portion is less than a predetermined amount of the front facing surface;
selecting, by the one or more processors, the identified container within the one or more 2D images for volumetric analysis based upon the determining that the occluded portion is less than the predetermined amount;

classifying, by the one or more processors, a portion of the selected container containing the liquid; and determining, by the one or more processors, the volume of liquid held within the container based upon the classified portion.

2. The method of claim 1, further comprising, by the one or more processors:

determining a ratio of a height of the liquid held within the selected container to a total height of the selected container; and determining a volume of the liquid held within the selected container based upon the determined ratio and a total volume of the selected container.

3. The method of claim 1, further comprising receiving, by the one or more processors, a 3D model representing the site at a second time prior to the first time.

4. The method of claim 1, wherein the one or more 2D images are at least one of infrared (IR) images, color images, gray-scale images, or a combination thereof.

5. The method of claim 3, further comprising, by the one or more processors:

determining a boundary of the identified container within the one or more 2D images based upon the 3D model.

6. The method of claim 5, further comprising generating, by the one or more processors, a processed image by at least one of deskewing or dewarping the isolated front-facing surface of the selected container prior to classifying the portion of the selected container holding the liquid.

7. The method of claim 6, further comprising selecting, by the one or more processors, a center portion of the processed image prior to classifying the portion of the selected container holding the liquid.

8. The method of claim 5, further comprising generating, by the one or more processors, a processed image by binarizing the isolated front-facing surface of the selected container prior to classifying the portion of the selected container holding the liquid.

9. The method of claim 1, wherein the container is a cylinder.

10. The method of claim 2, wherein the ratio of the height of the liquid held within the container to the total height of the selected container is determined as a function of horizontal position, further wherein the height is determined at multiple horizontal locations of the container using a linear regression.

11. A computer program product comprising a non-transitory machine-readable medium storing instructions that, when executed by one or more processors, cause the one or more processors to perform operations comprising:

receiving, from one or more cameras, one or more 2D images of a site including one or more containers configured to hold a liquid, the 2D images being acquired at a first time;

identifying a container within the one or more of the 2D images;

determining a front facing surface of the identified container;

determining an occluded portion of the front facing surface of the identified container;

determining that the occluded portion is less than a predetermined amount of the front facing surface;

selecting the identified container within the one or more 2D images for volumetric analysis based upon the determining that the occluded portion is less than the predetermined amount;

classifying a portion of the selected container containing the liquid; and determining the volume of liquid held within the container based upon the classified portion.

12. The computer program product of claim 11, further configured to perform operations comprising:

determining a ratio of a height of the liquid held within the selected container to a total height of the selected container; and determining a volume of the liquid held within the selected container based upon the determined ratio and a total volume of the selected container.

13. The computer program product of claim 11, further configured to perform operations comprising receiving a 3D model representing the site at a second time prior to the first time.

14. The computer program product of claim 11, wherein the one or more 2D images are at least one of infrared (IR) images, color images, gray-scale images, or a combination thereof.

15. The computer program product of claim 13, further configured to perform operations comprising:

determining a boundary of the identified container within the one or more 2D images based upon the 3D model.

16. The computer program product of claim 15, further configured to perform operations comprising generating a processed image by at least one of deskewing or dewarping the isolated front-facing surface of the selected container prior to classifying the portion of the selected container holding the liquid.

17. The computer program product of claim 16, further configured to perform operations comprising selecting a center portion of the processed image prior to classifying the portion of the selected container holding the liquid.

18. The computer program product of claim 15, further configured to perform operations comprising generating a processed image by binarizing the isolated front-facing surface of the selected container prior to classifying the portion of the selected container holding the liquid.

19. The computer program product of claim 11, wherein the container is a cylinder.

20. The computer program product of claim 12, wherein the ratio of the height of the liquid held within the container to the total height of the selected container is determined as a function of horizontal position, further wherein the height is determined at multiple horizontal locations of the container using a linear regression.

* * * * *